United States Patent
Sareen et al.

(10) Patent No.: US 9,405,356 B1
(45) Date of Patent: Aug. 2, 2016

(54) TEMPERATURE COMPENSATION IN DATA STORAGE DEVICE

(71) Applicant: Western Digital Technologies, Inc., Irvine, CA (US)

(72) Inventors: Anil Sareen, Mission Viejo, CA (US); Yen Ming Huang, Irvine, CA (US); Sanwu Tan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 14 days.

(21) Appl. No.: 14/519,396

(22) Filed: Oct. 21, 2014

(51) Int. Cl.
*G06F 1/32* (2006.01)

(52) U.S. Cl.
CPC ............ *G06F 1/3268* (2013.01); *G06F 1/3287* (2013.01)

(58) Field of Classification Search
CPC .............................. G06F 1/3268; G06F 1/3287
USPC ......................................................... 365/226
See application file for complete search history.

(56) References Cited

U.S. PATENT DOCUMENTS

| | | | |
|---|---|---|---|
| 6,856,556 B1 | 2/2005 | Hajeck | |
| 7,126,857 B2 | 10/2006 | Hajeck | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,742,353 B2 * | 6/2010 | Chen | G11C 7/04 365/196 |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |

(Continued)

*Primary Examiner* — Hoai V Ho
*Assistant Examiner* — Tri Hoang

(57) ABSTRACT

Systems and methods are disclosed managing power and/or temperature in a data storage system. A hybrid data storage device comprises a disk component and a non-volatile semiconductor memory component. The data storage device further comprises a temperature sensor and a controller configured to receive a temperature signal from the temperature sensor indicating a temperature of at least a portion of the data storage device and, when the temperature is determined to be greater than a first temperature, manage power to the semiconductor memory according to a first power throttling state.

15 Claims, 4 Drawing Sheets

(56) References Cited

U.S. PATENT DOCUMENTS

| | | |
|---|---|---|
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 * | 4/2014 | Jean .............. G06F 11/0727 714/6.1 |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2007/0214375 A1 | 9/2007 | Burton |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2013/0311793 A1 * | 11/2013 | Chang .............. G06F 1/206 713/300 |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

TEMPERATURE COMPENSATION IN DATA STORAGE DEVICE

BACKGROUND

1. Field

This disclosure relates to data storage systems. More particularly, the disclosure relates to systems and methods for compensating for temperature in hybrid data storage devices.

2. Description of Related Art

Certain data storage devices, such as hybrid storage devices comprising magnetic memory as well as semiconductor memory, can be adversely affected by high device temperatures. High temperature in a data storage device may result in damage to physical device hardware and/or corruption of data stored thereon.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to controller board layouts in data storage systems.

Overview

Hybrid data storage systems are data storage systems that may comprise one or more data storage sub-systems, namely one or more hard disk drives (HDD) comprising magnetic storage media, as well as one or more solid-state storage drives (SSDs) comprising non-volatile solid-state media such as NAND flash, for example. In the context of a singular device, a hybrid data storage device may include rotating magnetic storage and solid-state storage. The various embodiments disclosed herein may be applied to both such data storage systems and data storage devices. For the sake of simplicity of description, a generic singular hybrid data storage device will be used as the primary example to refer to and cover both applications.

Figure 1:
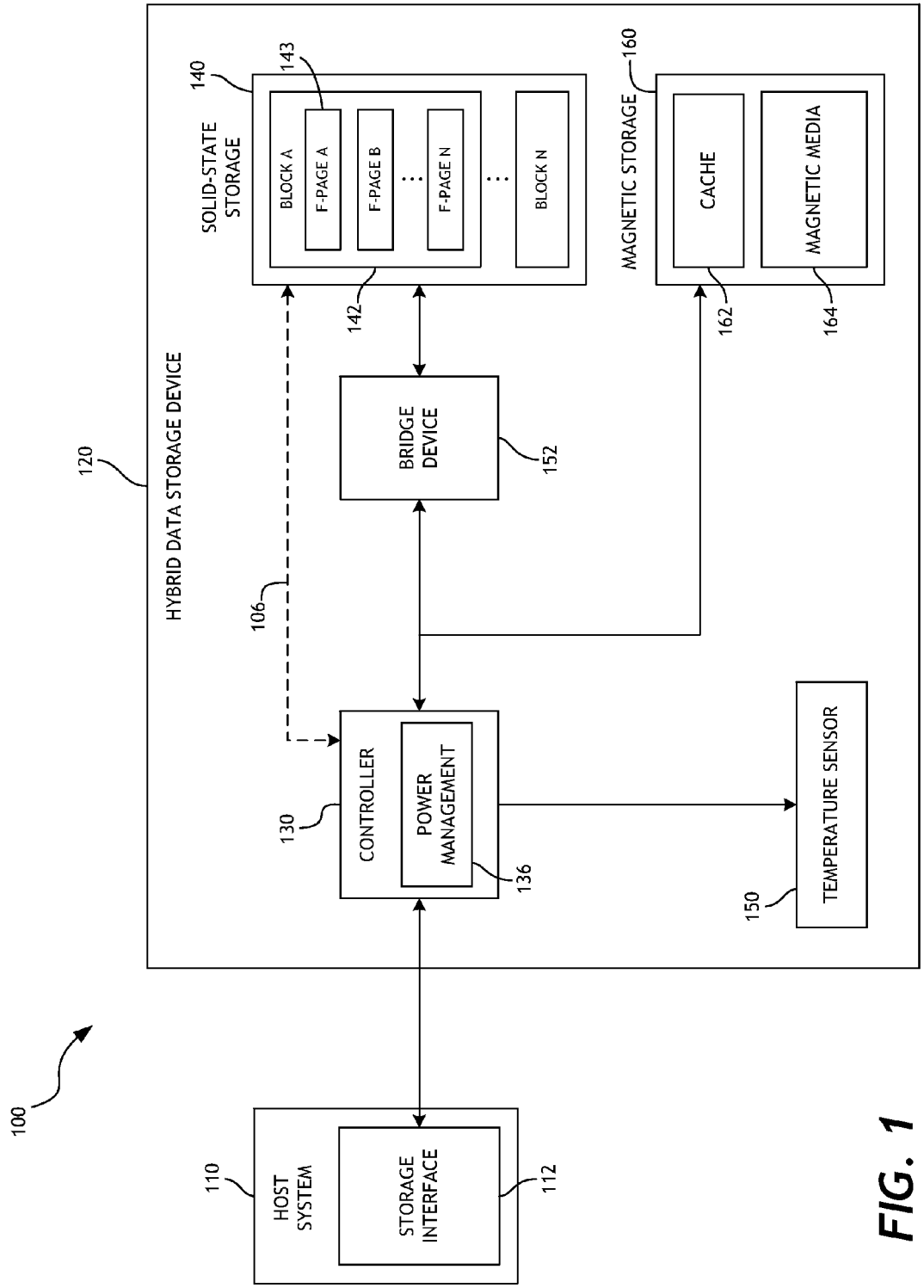
FIG. 1 is a block diagram representing a data storage system according to an embodiment.

As shown in FIG. 1, and described in further detail below, a hybrid data storage device may be communicatively coupled to a host system and receive data storage access commands that make up a workload for the hybrid data storage device (or hybrid drive). Certain types of host workloads may have characteristics that make it necessary or desirable for the hybrid data storage device to utilize both magnetic disk storage and non-volatile solid-state storage substantially simultaneously in order to service the host workload. For example, although in a hybrid drive host workload is often associated substantially exclusively with either solid-state storage or magnetic disk storage at a given time (e.g., whereas write operations may generally involve use of disk storage, read operations may generally involve use of solid-state storage), during the course of executing certain profiles (e.g., where file copy and HD video playback operations are executed simultaneously), a condition may exist in which write data is being directed to the disk storage, thereby causing the disk to spin up and consume power, while alternating commands may be directed to the solid-state storage, requiring it to also stay powered-up a consuming power. When both components of the hybrid drive are active at the same time in this way, substantial increase in device temperature may result. Such simultaneous operation can cause an increase in power consumption which, if sustained over a sufficiently long period of time, may result in a temperature rise within at least a portion of the drive that exceeds or approaches an operational range of the drive.

Certain embodiments disclosed herein provide for utilization within a hybrid data storage system/device of one or more temperature sensors or signals, wherein the hybrid system/device (e.g., drive firmware) is configured to identify workloads that cause or may cause undesirable increases in temperature based on a detection of device temperature, as indicated by the one or more temperature sensors or signals, exceeding a predetermined threshold. When such workload (s)/temperature(s) are identified, certain embodiments disclosed herein provide systems and/or methods for managing power associated with at least one or more non-volatile solid-state storage modules of the system/device. The power management systems and/or methods disclosed herein may involve transition from a full power mode to one or more lower-power modes, such as to a medium power mode, and further to a least power mode, in an embodiment. Such progression between power modes may allow for maintenance of device/system temperature substantially within safe or desirable ranges.

Certain alternative embodiments provide for power management systems and/or methods in which the temperature is allowed to rise to a maximum value or range, wherein once such value or range is exceeded, use of the non-volatile solid-state memory (NVSM) may be discontinued and/or data stored on the NVSM is migrated at least in part to magnetic media of the hybrid drive. Access to such data may thereafter be achieved through the magnetic media.

Hybrid Data Storage Device

FIG. 1 is a block diagram illustrating an embodiment of a combination of a host system 110 with a hybrid data storage device 120 incorporating temperature compensation functionality in accordance with one or more embodiments disclosed herein. As shown, the hybrid data storage device 120 includes a controller 130 configured to receive data commands and execute such commands in a non-volatile solid-state memory (NVSM) 140, which may include non-volatile solid-state memory cells, and/or in a magnetic storage device 160, which may include magnetic media 164. The magnetic storage 160 may include a cache 162. Although the cache is shown as a component of the magnetic storage 160, it should be understood that the cache 162 may be disposed in any portion of the storage device 120 and may be associated with any of the components of the device. Furthermore, the cache 162 may be shared among the various data storage components of the device 120.

The host commands received by the controller 130 from the host system 110 may include data read/write commands, and the like. The controller 130 may be configured to receive data commands from a storage interface (e.g., a device driver) 112 residing on a host system 110. Data may be accessed/transferred based on such commands. The host's storage interface 112 can communicate with the hybrid data storage device 120 using any known communication protocol, such as SATA, SCSI, SAS, USB, Fibre Channel, PCIe, eMMC, or the like.

As used in this application, "non-volatile solid-state memory," "NVSM," "non-volatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

The hybrid data storage device 120 can store data received from the host system 110 such that the data storage device 120 acts as data storage for the host system 110. To facilitate this function, the controller 130 may implement a logical interface. The logical interface can present to the host system memory as a set of logical addresses (e.g., sequential/contiguous addresses) where data can be stored. Internally, the controller 130 can map logical addresses to various physical memory addresses in the non-volatile solid-state storage 140 and/or magnetic storage module 160.

Mapping data indicating the mapping of logical addresses to physical memory addresses may be maintained in the data storage device 120. For example, mapping table data may be stored in non-volatile solid-state storage 140 and/or magnetic storage module 160 in order to allow for recreation of mapping tables following a power cycle. In certain embodiments, the controller may maintain a mapping table to address the NVSM mapping, whereas the magnetic storage 160 portion of the hybrid device 120 is addressed directly. Furthermore, the controller 130 may maintain a special mapping table to determine whether data is stored in the NVSM 140 or the magnetic storage 160.

The controller 130 may include one or more memory modules (not shown), such as non-volatile memory (e.g., ROM) and/or volatile memory (e.g., RAM, such as DRAM). In certain embodiments, the controller 130 may be configured to store information, including, for example, operating system(s) code, application code, system tables and/or other data in such memory module(s). On power-up, the controller 130 may be configured to load the data for use in operation of the data storage device. In one embodiment, the controller 130 is implemented on a SoC (System on Chip), though those skilled in the art will recognize that other hardware/firmware implementations are possible.

In order to prevent or reduce the effects of excessively-high temperatures in the storage device 120, or portion thereof, the hybrid data storage device 120 may include one or more temperature sensors 150, which may be disposed within a housing of the storage device. For example, one or more temperature sensors may be disposed in physical proximity to the magnetic storage 160, such as in, or associated with, a disk head and/or suspension structure of the magnetic storage. The temperature sensor(s) 150 may be configured to detect temperature levels associated with at least a portion of the hybrid data storage device 120.

The controller 130 may include a power management module 136, which may be configured to control the provision of power to one or more components of the hybrid data storage device 120. In certain embodiments, the power management is configured to at least partially cut off power to the solid-state storage 140, as well as to an optional bridge device 152, which may be coupled to the solid-state storage (NVSM) 140 and may perform some level of basic channel management of the NVSM, as well as signal processing. In some embodiments, the controller 130 may incorporate some of all of the functionalities of the bridge device and directly control the operations of the solid-state storage 140.

As shown and referenced above, in addition to the NVSM 140 and bridge device 152 components, the hybrid data storage device includes a magnetic storage module 160 which comprises magnetic media 164, such as a rotating hard disk drive (HDD). The controller 130 in this embodiment would thus manage data accesses to both the NVSM storage module 140 and the magnetic storage module 160. In one embodiment, a different interface may be used to connect the controller 130 to the magnetic storage module 160 than is used to connect the controller 130 to the bridge device 152 and/or NVSM 140.

Power Management

As described above, it may be necessary or desirable to prevent a data storage device, such as a hybrid device, from experiencing temperatures that exceed a maximum rating, or value, associated with the device. For example, a storage device may be adversely affected by temperatures above 60° C., or other value. Therefore, various mechanisms may be implemented within the scope of the present disclosure to reduce internal power consumption by solid-state storage modules or components, thereby reducing device temperature to some extent. In certain embodiments, the internal device temperature is monitored for the purpose of implementing power management of one or more components of the data storage system/device, such as solid-state memory components, to reduce power consumption thereof. Reducing power consumption as described herein may cause some amount of degradation of device performance; the tiered power management scheme described in greater detail below involves transitioning power allocation to solid-state storage from less power-conserving mode(s) to more power-conserving mode(s) as the device temperature crosses over predetermined threshold(s). Such transitioning may at least partially slow the device performance, while keeping the device temperature in substantially safe operational range.

Figure 2:
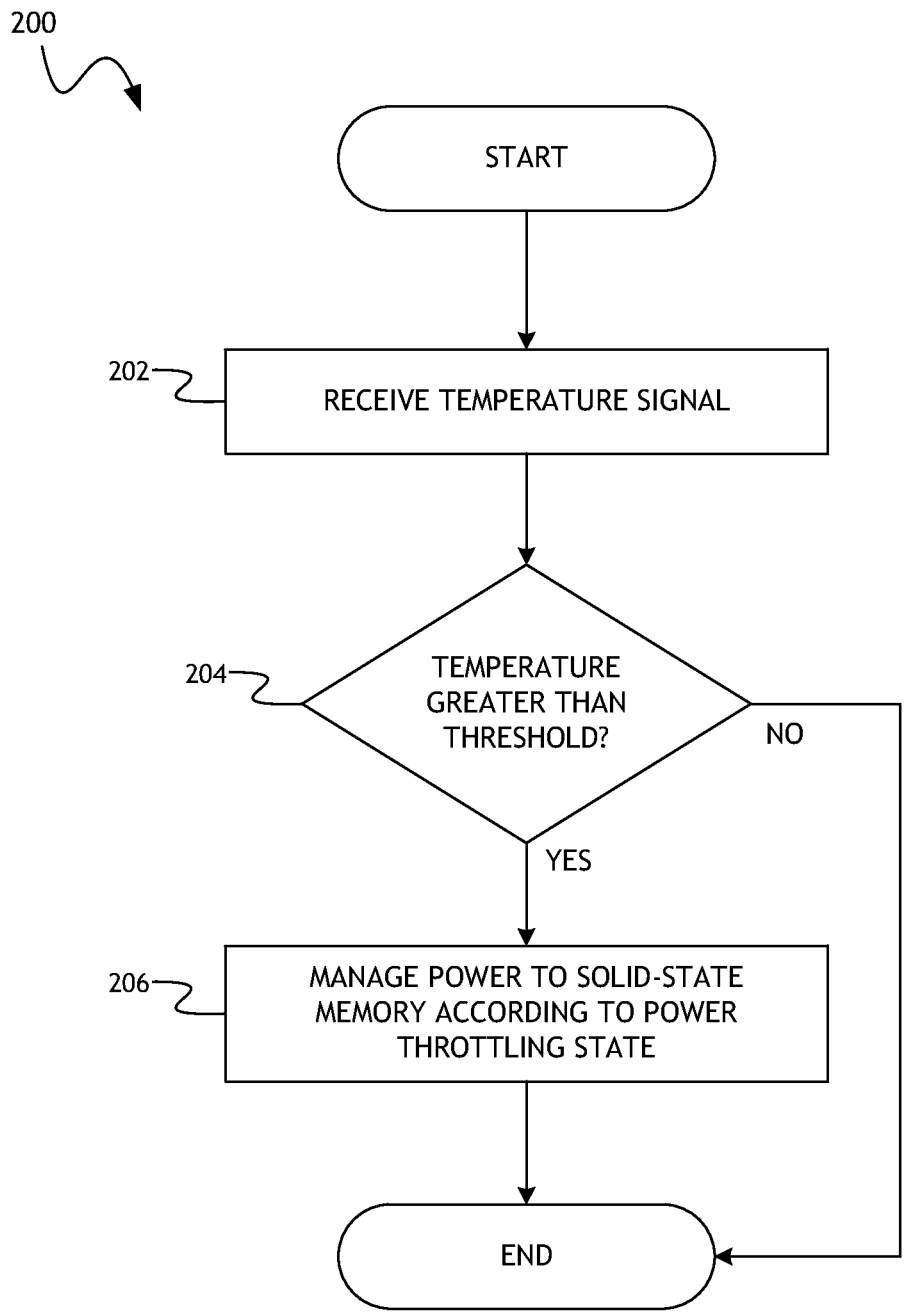
FIG. 2 is a flow diagram illustrating a process for managing power in a data storage system according to one or more embodiments.

FIG. 2 is a flow diagram illustrating a process 200 for managing power in a data storage system/device according to one or more embodiments disclosed herein. The process 200 may provide an abstract, high-level representation of a process for managing power to one or more components of the data storage device. As described above, a data storage device may comprise one or more temperature sensors, or means by which a data storage device, or controller thereof, may obtain a temperature signal indicating a temperature of one or more portions of the data storage device. At block 202, the process 200 involves receiving one or more temperature signals. Such temperature signal(s) may comprise information indicating a temperature of the data storage device. In certain embodiments, the temperature signal indicates a temperature of a solid-state memory, or portion thereof. In certain embodiments, when the device control circuitry detects a heavy workload and the device temperature reaches a predetermined threshold, the power management of the solid-state storage subsystem may be employed. For example, the power reduction may incrementally step from full power to a medium power state, and/or further to a lesser, or least power state in order to keep the device temperature in the safe operating range.

At decision block 204, the process 200 involves determining whether the temperature of the storage device, or portion thereof, is greater than a predetermined threshold value. For example, the temperature threshold may be approximately 40° C., 50° C., 55° C., 60° C., or other value. If the temperature is not greater than the threshold value, the process may effectively terminate, or may involve waiting for a predetermined period of time or for the occurrence of one or more events, after which the process may return to block 202, wherein the temperature of the storage device may be reassessed.

If it is determined that the temperature is greater than the threshold value, the process 200 may involve, as shown at block 206, managing power to the solid-state memory of the data storage device according to certain power-throttling parameters. For example, the data storage system may enter a power throttling state. In a power throttling state, the storage device may implement any of the features and/or principles disclosed herein for reducing power consumption of one or more components of the data storage device in order to manage temperature. Temperature management according to the process 200 of FIG. 2 may provide for maintenance of the solid-state memory below a critical temperature, such that the temperature may not substantially adversely affect the integrity and/or health of the solid-state memory or other device components. In certain embodiments, power management as described herein may help ensure that the device operating temperature does not exceed reliability ratings of various components, which may be rated at, for example, 65° C.

Figure 3:
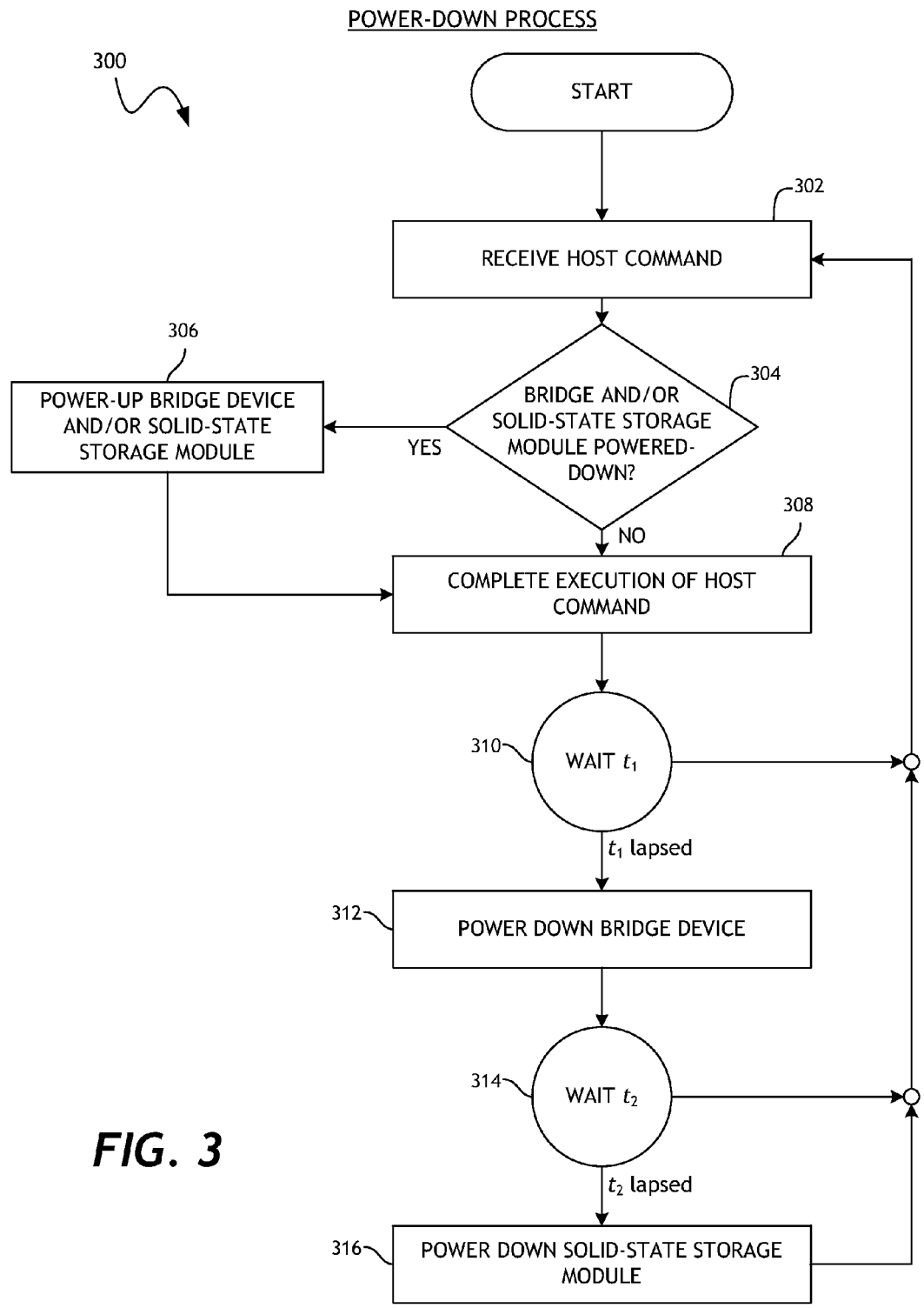
FIG. 3 is a flow diagram illustrating a process for managing power in a data storage system according to one or more embodiments.

FIG. 3 is a flow diagram illustrating a process 300 for powering down one or more components of a data storage system or device. The process 300 may involve receiving one or more host commands at block 302. When a host command is received, the process 300 may involve determining whether or not a solid-state storage module and/or associated bridge device is in a powered-down state at decision block 304. If so, the process 300 may proceed to block 306, where the one or more powered-down components may be powered up. As an example, the solid-state storage module and/or bridge device may have been powered down in connection with a power and/or temperature management scheme, as described herein.

Power management as disclosed herein may utilize one or more timer values, which may be tracked by the device controller (e.g., controller 130). At block 308, the received host command may have been completed, or one or more operations associated with the host command may have been successfully completed. Once the host operation has been completed, the process 300 may involve waiting for receipt of a subsequent host command, wherein if such host command is not received within a pre-determined window of time defined by a timer value $t_1$, as shown at block 310, the process 300 may involve powering down one or more components of the data storage device, such as a bridge device of the data storage device. If, however, a host command is received before the period of time $t_1$, lapses, the process 300 may proceed back to block 312, which represents receipt of such host command. The process 300 may then continue in the illustrated loop.

The powering down of, e.g., the bridge device, as shown in block 312, may provide a mechanism for reducing temperature of the storage device, such as the temperature of one or more solid-state storage modules and/or other components of the data storage device. That is, the value of the timer variable $t_1$ may be selected and/or implemented to create a desirable power-saving scheme. Furthermore, one or more additional timers may also be utilized in order to manage power-down of one or more additional components of the data storage device. For example, as shown, the process 300 may further involve, once the bridge device has been powered down a block 312, waiting for receipt of a subsequent host command at block 314. If a host command is received before the passage of a predetermined window of time defined by another timer value $t_2$, similarly to the progression of the process 300 with respect to block 310, the process may proceed back to block 302 and continue in the illustrated loop. If, however, the predetermined secondary window of time represented by the timer value $t_2$ lapses before a subsequent host command is received, the process 300 may involve further powering down one or more additional modules and/or components of the data storage device, such as the solid-state storage module. As described above, the solid-state storage module may be a component of a hybrid storage device including a magnetic storage component in addition to the solid-state memory module.

The process 300 illustrates an example power/temperature management process, wherein one or more timer values (e.g., $t_1$, $t_2$) are utilized to control the timing and/or sequence of powering down one or more components of the data storage device or system. Manipulation and/or variation of the timer values shown, or additional timer values (not illustrated in FIG. 3), may alter the functionality and/or effect of the power/temperature management scheme represented by the flow chart of FIG. 3. Certain embodiments disclosed herein provide processes, systems and/or mechanisms for setting and/or modifying timer values associated with power-down of one or more components of a data storage device or system in order to substantially prevent overheating of the component(s).

Figure 4:
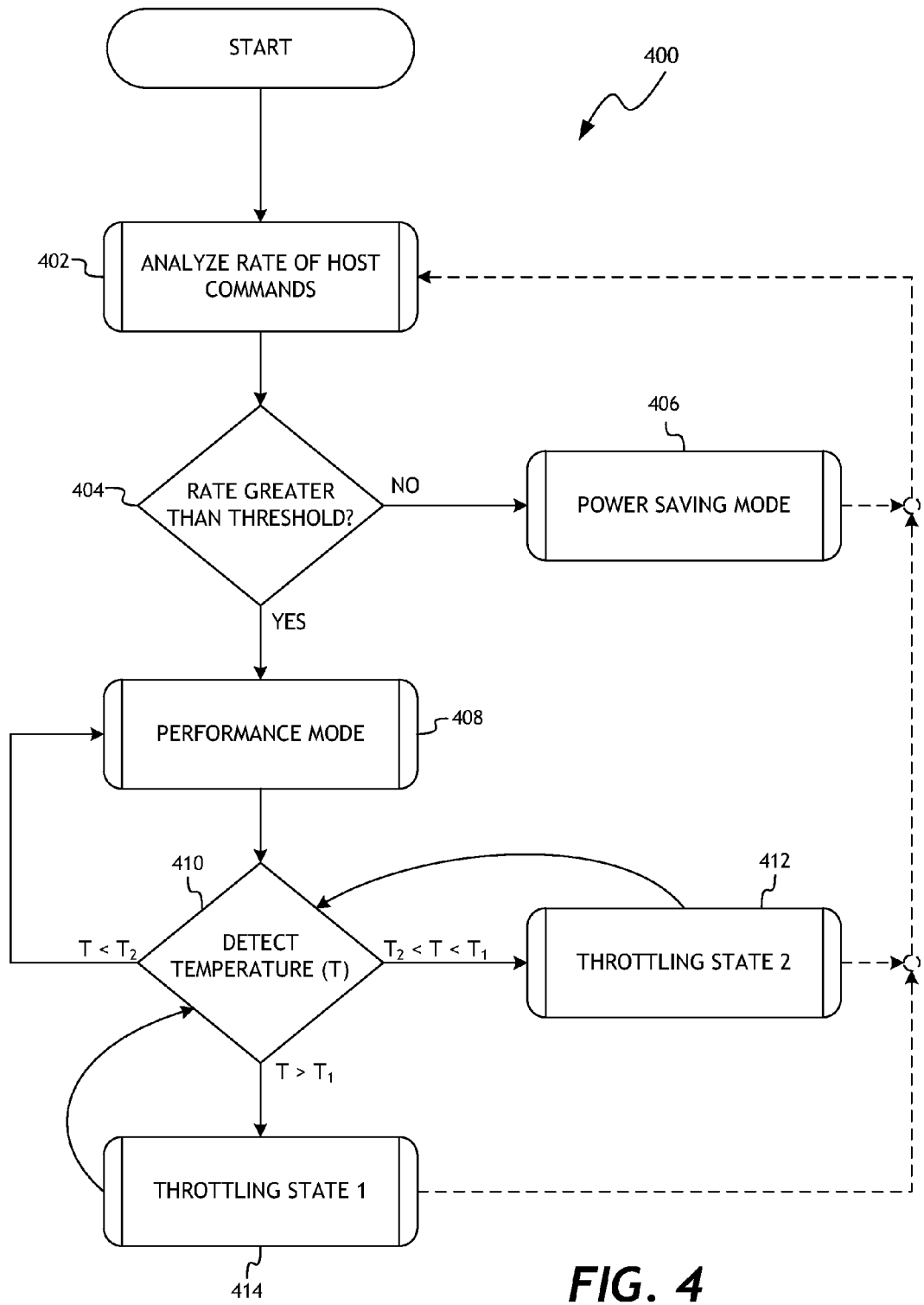
FIG. 4 is a flow diagram illustrating a process for managing power in a data storage system according to one or more embodiments.

FIG. 4 is a flow diagram illustrating a process 400 for managing power in a data storage system according to one or more embodiments. In certain embodiments, the process 400 may involve implementing a sub-process 402 for analyzing a rate of host commands received by a data storage device. For example, the sub process 402 illustrated in FIG. 4 may involve receiving one or more host commands and determining a rate of receipt of the host commands over a period of time. As shown at decision block 404, the process 400 may proceed to determine whether the calculated rate of receipt of host commands is greater than a predetermined threshold rate. If not, the process 400 may proceed to block 406 where a power saving mode is entered with respect to one or more components of the data storage device. In the power saving mode, one or more components of the data storage device may be powered-down in order to provide power savings, and/or to control a temperature associated with one or more components of the data storage device. In certain embodiments, in power saving mode, the rate of host commands may be less than about one command per second.

If the determined rate of receipt of host commands is greater than the predetermined threshold, the process 400 proceeds to block 408 where the data storage device, or one or more components thereof, may be placed into a performance mode of operation. The performance mode may be associated with power management parameters commensurate with a general preference for high performance over power consumption concerns. That is, the performance mode 408 may be associated with maintaining one or more components of the data storage device, such as components associated with the solid-state memory, in a powered state, wherein power-down of such components is not aggressively invoked.

While in the performance mode 408, the temperature of the storage device may increase beyond one or more threshold levels. For example, in a hybrid data storage device, a data storage workload requiring simultaneous, or substantially-simultaneous, access to multiple components of the data storage device, such as to a magnetic memory module and one or more solid-state memory modules, may result in undesirable, uncomfortable and/or potentially-damaging rise in temperature within at least a portion of the data storage device. It may therefore be desirable and/or necessary to detect such a workload or condition in order to prevent temperatures from rising and/or remaining above critical levels.

In order to substantially prevent physical damage and/or integrity issues associated with storage device temperatures exceeding critical levels, the process 400 may involve implementing logical functionality in order to manage power to one or components of the data storage device. For example, as shown, the process 400 may include a decision block 410, wherein a temperature associated with one or more components of the data storage device is detected and/or determined and analyzed in some manner, as shown. For example, the process 400 may involve determining whether the detected temperature is greater than a threshold level $T_2$. The process 400 may utilize any desirable or suitable value for $T_2$, which serves as a threshold temperature above which power saving mechanisms may be implemented. For example, $T_2$ may be at or around 55° C. In certain embodiments $T_2$ is set at or about 40° C. As described in greater detail below, power throttling may involve setting timer values to effect aggressive shut off, or even complete shut off, of solid-state memory components.

If the temperature is less than the threshold level $T_2$, the process 400 may proceed back to operational performance mode as represented by block 408. If, however, the temperature is greater than the threshold level $T_2$, the process 400 may involve placing one or more components of the data storage device into a thermal throttling state. For example, the data storage device may be configured to operate in a plurality of thermal throttling states, depending on the temperature of the device.

As an example, when it is determined that the temperature is greater than the threshold level $T_2$, but does not exceed a higher threshold level $T_1$, the process 400 may involve placing the data storage device, or one or more components thereof, into a throttling state 412 (identified in FIG. 4 as "Throttling State 2" for convenience). The throttling state 412 may be associated with the utilization of timer values, as described above and illustrated in FIG. 3, that are shorter in length than default timer values implemented in the performance mode 408. By using relatively shorter timer values, the process 400 may allow for more aggressive power-down of one or more components of the data storage device in the first throttling state 412 in order to more quickly power down one or more components associated with solid-state memory in order to manage power, and thereby manage temperature, within the data storage device.

If it is determined that the temperature of the data storage device exceeds the higher threshold temperature level $T_1$, the process 400 may involve placing the data storage device, or one or more components thereof, into a more aggressive throttling state 414 (identified in FIG. 4 as "Throttling State 1" for convenience). Similarly to throttling state 412, the throttling state 414 may be associated with one or more timer values that are shorter in length or duration relative to corresponding timer values utilized by the process 400 in the performance mode 408, thereby providing more aggressive power-down of certain components of the data storage device. Furthermore, the timer values associated with the throttling state 414 may be relatively more aggressive than those associated with thermal throttling state 412, in order to compensate for the higher temperature of the data storage device when entering the more aggressive throttling state 414 compared to the temperature associated with entering the less aggressive throttling state 412. Such power throttling may effectively slow down the response time to the host, thereby potentially affect performance negatively. Therefore, implementation of certain features and/or concepts disclosed herein may represent a sacrifice of performance to some degree in order to maintain lower device temperatures.

In the process 400, when operating in one of the throttling states, or in performance mode, periodic or sporadic re-checking of temperature values may be implemented in order to continually determine which power-management/throttling state the data storage device should be in at a given time. For example, predetermined periodic intervals of time after entering any of the individual throttling states and/or performance mode state 408, such as every second, temperature may be reassessed and the power management state of the storage device may be modified accordingly in the event that the temperature condition of the storage device has changed in the interim. Furthermore, the process 400 may periodically or sporadically loop back to block 402 for reanalysis of the rate of host command receipt in order to continually determine whether the data storage device should operate in the power saving mode 406 or performance mode branch of the flow diagram 400.

Although any desirable timer values may be implemented to achieve power throttling for the various power throttling states of the process 400, the following example timer values may be used in an embodiment, wherein $t_1$ represents a first timer associated with powering down a bridge device and $t_2$ represents a second timer associated with powering down a solid-state memory module, as described above with reference to FIG. 3. For the performance mode 408, $t_1$, may have a value of approximately 750 ms, whereas $t_2$ may have a value of approximately 500 ms. For the throttling state 412, $t_1$ may have a value of approximately 280 ms, whereas $t_2$ may have a value of approximately 20 ms. For the more aggressive throttling state 414, $t_1$ may have a value of approximately 100 ms, whereas $t_2$ may have a value of approximately 20 ms.

Various power throttling mechanisms disclosed herein may provide the ability to maintain a hybrid storage system within an operational temperature range according to specifications associated with the device. Furthermore, embodiments may help to prevent a hybrid storage system from heating up other components of a computing system, such as in an environment in which the hybrid system (or non-hybrid solid-state storage system) is a component of a tablet computer, smartphone, laptop computer, or other computing device, where the device has a relatively small form factor, which may introduce a relatively higher risk of burn or discomfort when the user's skin or person is in direct contact with the system.

In certain embodiments, the temperature is allowed to rise to a maximum allowable temperature, at which point some or all of the data stored in the solid-state storage portion of the hybrid device is migrated to the magnetic disk portion of the device. Such a method may allow for the maintenance of device performance at an optimal level until the maximum temperature is reached.

Additional Embodiments

Those skilled in the art will appreciate that in some embodiments, other types of temperature compensation and/or power management systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
   a disk;
   a non-volatile semiconductor memory;
   a temperature sensor; and
   a controller configured to:
      receive a temperature signal from the temperature sensor indicating a temperature of at least a portion of the data storage device; and
      when the temperature is determined to be greater than a first temperature, manage power to the semiconductor memory according to a first power throttling state;
   wherein the first power throttling state is designed to allow the data storage device to maintain device temperature below a critical level when executing a workload requiring at least partially simultaneous access to both the disk and the semiconductor memory.

2. The data storage device of claim 1, wherein said managing power to the semiconductor memory comprises setting one or more timer values to reduced value(s).

3. The data storage device of claim 1, wherein the controller is further configured to manage power to the semiconductor memory according to a second power throttling state when the temperature is less than the first temperature but greater than a second temperature that is lower than the first temperature.

4. A data storage device comprising:
   a disk;
   a non-volatile semiconductor memory;
   a temperature sensor;
   a controller; and
   a bridge device communicatively coupled to the semiconductor memory and the controller:
   wherein the controller is configured to:
      receive a temperature signal from the temperature sensor indicating a temperature of at least a portion of the data storage device;
      when the temperature is determined to be greater than a temperature threshold, set first and second timer values according to a power throttling state;
      power down the bridge device based on the first timer value; and
      power down the semiconductor memory based on the second timer value.

5. A data storage device comprising:
   a disk;
   a non-volatile semiconductor memory;
   a temperature sensor; and
   a controller configured to:
      receive a temperature signal from the temperature sensor indicating a temperature of at least a portion of the data storage device; and
      when the temperature is determined to be greater than a first temperature, manage power in the data storage device at least in part by setting first and second timer values to first and second reduced timer values, respectively, according to a first power throttling state.

6. The data storage device of claim 5, wherein the first reduced timer value is approximately 100 ms and the second reduced timer value is approximately 20 ms.

7. The data storage device of claim 5, wherein the controller is further configured to set the first and second timer values to third and fourth reduced timer values, respectively, according to a second power throttling state when the temperature is less than the first temperature but greater than a second temperature lower than the first temperature.

8. The data storage device of claim 7, wherein the third reduced timer value is approximately 280 ms and the fourth reduced timer value is approximately 20 ms.

9. The data storage device of claim 3, wherein the first temperature is greater than 50° C.

10. The data storage device of claim 9, wherein the second temperature is greater than 35° C.

11. A data storage device comprising:
    a disk;
    a temperature sensor;
    a non-volatile semiconductor memory; and
    a controller configured to:
       determine that a number of commands received by the controller from a host device within a predetermined period of time exceeds a threshold number of commands;

in response to said determination, determine whether a temperature of at least a portion of the data storage device is greater than a first temperature threshold based at least in part on a temperature signal received from the temperature sensor; and when the temperature is determined to be greater than the temperature threshold, manage power to the semiconductor memory according to a power throttling state;

wherein the power throttling state is designed to allow the data storage device to maintain device temperature below a critical level when executing a workload requiring at least partially simultaneous access to both the disk and the semiconductor memory.

12. A method of managing temperature in a data storage device, the method comprising:

by a controller of the data storage device comprising a disk and a non-volatile semiconductor memory:

receiving a temperature signal from a temperature sensor indicating a temperature of at least a portion of the data storage device;

when the temperature is determined to be greater than a first temperature, managing power to the semiconductor memory by setting first and second timer values according to a first power throttling state;

powering down a bridge device communicatively coupled to both the semiconductor memory and the controller based on the first timer value; and powering down the semiconductor memory based on the second timer value.

13. The method of claim 12, further comprising setting the first and second timer values according to a second power throttling state when the temperature is less than the first temperature but greater than a second temperature that is lower than the first temperature.

14. The method of claim 13, wherein setting the first and second timer values according to the first power throttling state comprises setting the first and second timer values to first and second reduced timer values, respectively.

15. The method of claim 14, wherein setting the first and second timer values according to the second power throttling state comprises setting the first and second timer values to third and fourth reduced timer values, respectively.

* * * * *